(12) United States Patent
Colombo

(10) Patent No.: US 9,995,168 B2
(45) Date of Patent: Jun. 12, 2018

(54) HOVER AIRCRAFT ROTOR COMPRISING A VIBRATION DAMPING DEVICE

(71) Applicant: AGUSTAWESTLAND S.p.A., Rome (IT)

(72) Inventor: Attilio Colombo, Samarate (IT)

(73) Assignee: AGUSTAWESTLAND S.P.A., Rome (IT)

( * ) Notice: Subject to any disclaimer, the term of this patent is extended or adjusted under 35 U.S.C. 154(b) by 987 days.

(21) Appl. No.: 14/503,848

(22) Filed: Oct. 1, 2014

(65) Prior Publication Data

US 2015/0098801 A1 Apr. 9, 2015

(30) Foreign Application Priority Data

Oct. 3, 2013 (EP) ..................................... 13425136

(51) Int. Cl.
*B64C 27/00* (2006.01)
*F01D 25/04* (2006.01)
*F16F 7/116* (2006.01)
*F16F 7/10* (2006.01)

(52) U.S. Cl.
CPC ............ *F01D 25/04* (2013.01); *B64C 27/001* (2013.01); *F16F 7/1011* (2013.01); *F16F 7/116* (2013.01); *B64C 2027/003* (2013.01); *B64C 2027/004* (2013.01); *B64C 2027/005* (2013.01)

(58) Field of Classification Search
CPC .............................. F01D 25/04; B64C 27/001
USPC ............................................................ 416/44
See application file for complete search history.

(56) References Cited

U.S. PATENT DOCUMENTS

| 4,281,967 | A | 8/1981 | Mouille et al. | |
|---|---|---|---|---|
| 6,045,090 | A | 4/2000 | Krysinsky et al. | |
| 7,370,829 | B2* | 5/2008 | Badre-Alam | B64C 27/001 180/312 |
| 7,857,255 | B2* | 12/2010 | Pancotti | B64C 27/001 181/207 |
| 2010/0296930 | A1 | 11/2010 | Girard et al. | |
| 2010/0296931 | A1 | 11/2010 | Girard | |
| 2012/0298794 | A1 | 11/2012 | Krysinski et al. | |

* cited by examiner

*Primary Examiner* — Richard Edgar
*Assistant Examiner* — Michael Sehn
(74) *Attorney, Agent, or Firm* — Leason Ellis LLP

(57) ABSTRACT

A hover aircraft rotor having a hub which rotates about an axis and has a number of blades; a drive shaft connectable to a drive member of the aircraft and connected functionally to the hub to rotate the hub about the axis; and damping means for damping vibration transmitted to the shaft, and which include a mass designed to oscillate, in use, to oppose transmission to the shaft of vibration generated by rotation of the blades; the mass being free to oscillate parallel to the axis, to oppose transmission to the shaft of vibration having main components along the axis.

14 Claims, 4 Drawing Sheets

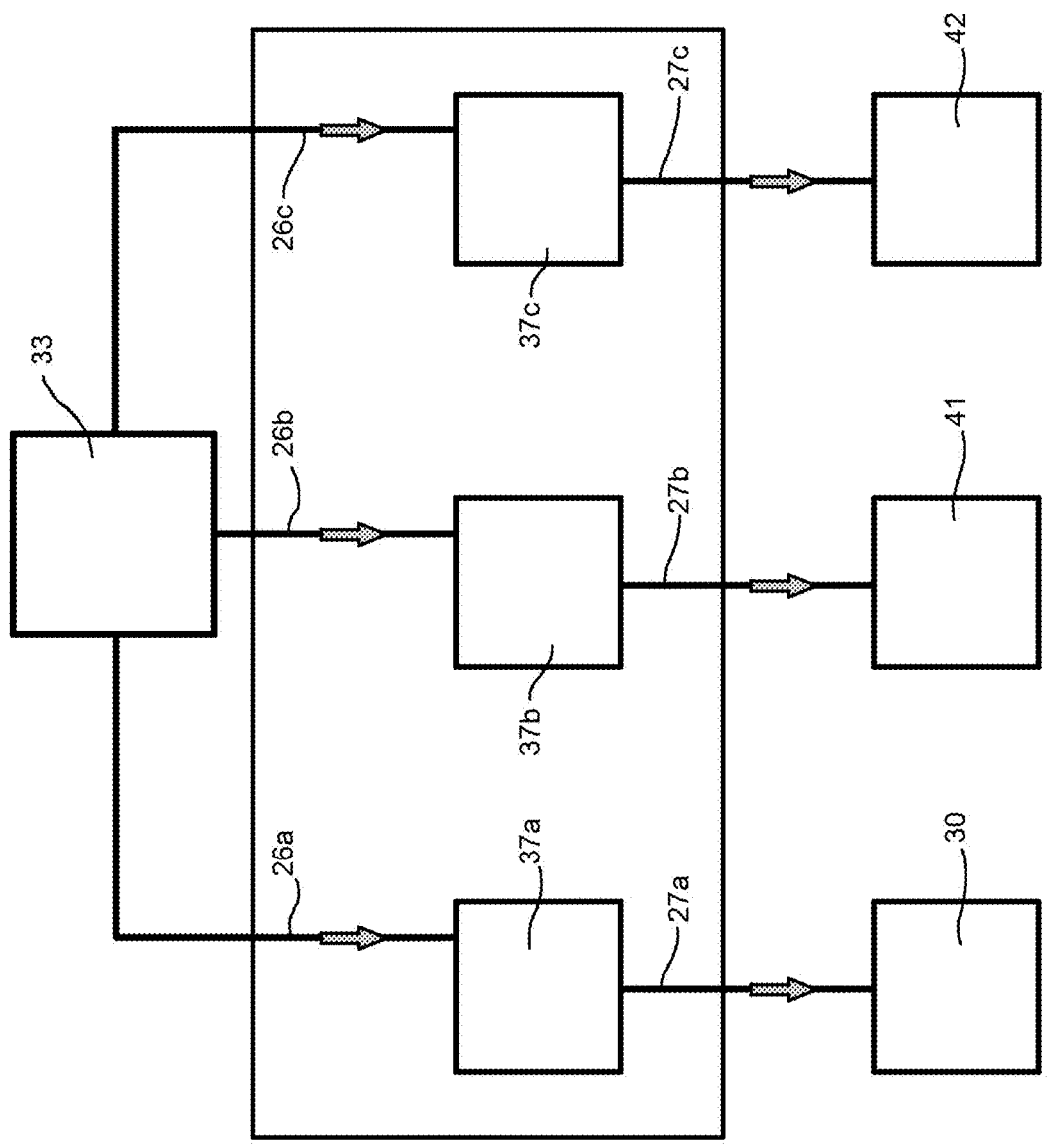

HOVER AIRCRAFT ROTOR COMPRISING A VIBRATION DAMPING DEVICE

CROSS-REFERENCE TO RELATED APPLICATION

The present claims priority to European Patent Application No. 13425136.2, filed Oct. 3, 2013, which is hereby incorporated by reference in its entirety.

TECHNICAL FIELD

The present invention relates to a hover aircraft rotor, in particular a helicopter rotor, comprising a vibration damping device.

BACKGROUND OF THE INVENTION

Helicopters are known which substantially comprise a fuselage; a main rotor on top of the fuselage, and which rotates about a respective axis; a tail rotor at the rear end of the fuselage; two horizontal tail surfaces; and two vertical tail surfaces.

More specifically, the rotor substantially comprises a hub, which rotates about said axis and has a number of blades fixed to and projecting radially from the hub; and a drive shaft connectable to a drive member and connected functionally to the hub to rotate it.

Operation of the rotor produces high- and low-frequency vibration. More specifically, low-frequency vibration is produced by the wash from the blades and from the centre of the hub. The wash from the centre of the hub impacts the vertical and horizontal aerodynamic tail surfaces and the tail rotor.

To avoid generating low-frequency vibration, the rotor comprises a flow diverter mounted over the centre of the rotor and extending annularly about the rotor rotation axis.

More specifically, the flow diverter is designed to direct the wash produced by the rotor, so as to avoid the wash effects and prevent the wash from impacting the tail rotor and relative supporting structures.

High-speed rotation of the blades also produces high-frequency vibration, which is transmitted to the drive shaft and, hence, to the helicopter.

Generation and transmission of high-frequency vibration to the drive shaft of the rotor are prevented using damping devices fitted to the rotor and tuned to one or more high-frequency vibration frequencies.

One such damping device is described in Patent Applications GB-A-2014099 and FR-A-2749901.

In particular, FR-A-2749901 disclose a damping device, which reduces the transmission of vibrations in a plane orthogonal to the axis of the rotor to the fuselage. The damping device comprises driving means which bring a mass in a required adjustment position along the axis of the rotor, without exerting any damping action on this mass.

As a result, the damping device shown in FR-A-2749901 can in no way reduce the transmission of axial vibrations from the blades to the fuselage.

The Applicant's Patent Application PCTIB2008001594 describes a simple, low-cost damping device designed to prevent generation and transmission of high-frequency vibration to the drive shaft of the rotor, without interfering with the aerodynamics and operation of the rotor and/or flow diverter.

More specifically, the above damping device substantially comprises:

a mass housed in the flow diverter; and
a rod, which is supported coaxially by the shaft at a first axial end, and is connected to the mass at a second axial end opposite the first end.

More specifically, the rod is axially rigid enough to secure the mass in a substantially fixed position along the rotor axis.

Conversely, the flexural rigidity of the rod is such as to allow the mass to vibrate in a plane perpendicular to the rotor axis and at a characteristic rotor rotation frequency, and therefore to oppose transmission to the shaft of flexural vibration produced by rotation of the hub and blades.

The damping device described above therefore only effectively opposes transmission to the shaft of flexural vibration in a plane substantially perpendicular to the rotor axis, and at a frequency around a specific given frequency determined by the flexural rigidity of the rod and the weight of the mass.

In other words, the damping device described above is a 'passive' element tuned to a specific frequency of the flexural vibration for damping.

A need is felt within the industry to effectively also oppose transmission to the shaft of axial vibration, i.e. parallel to the shaft axis.

Following the introduction on helicopters of variable-speed rotors, i.e. designed to rotate at different speeds during operation of the helicopter, a need is also felt to prevent transmission to the drive shaft of vibration with a highly variable frequency range.

SUMMARY OF THE INVENTION

It is an object of the present invention to provide a hover aircraft rotor designed to meet at least one of the above requirements in a straightforward, low-cost manner.

According to the present invention, there is provided a hover aircraft rotor, as claimed in claim 1.

BRIEF DESCRIPTION OF THE DRAWINGS

A preferred, non-limiting embodiment of the present invention will be described by way of example with reference to the attached drawings, in which:

FIG. 4 shows a schematic of further component parts of the rotor in FIGS. 1 to 3.

DETAILED DESCRIPTION OF THE INVENTION

Figure 1:
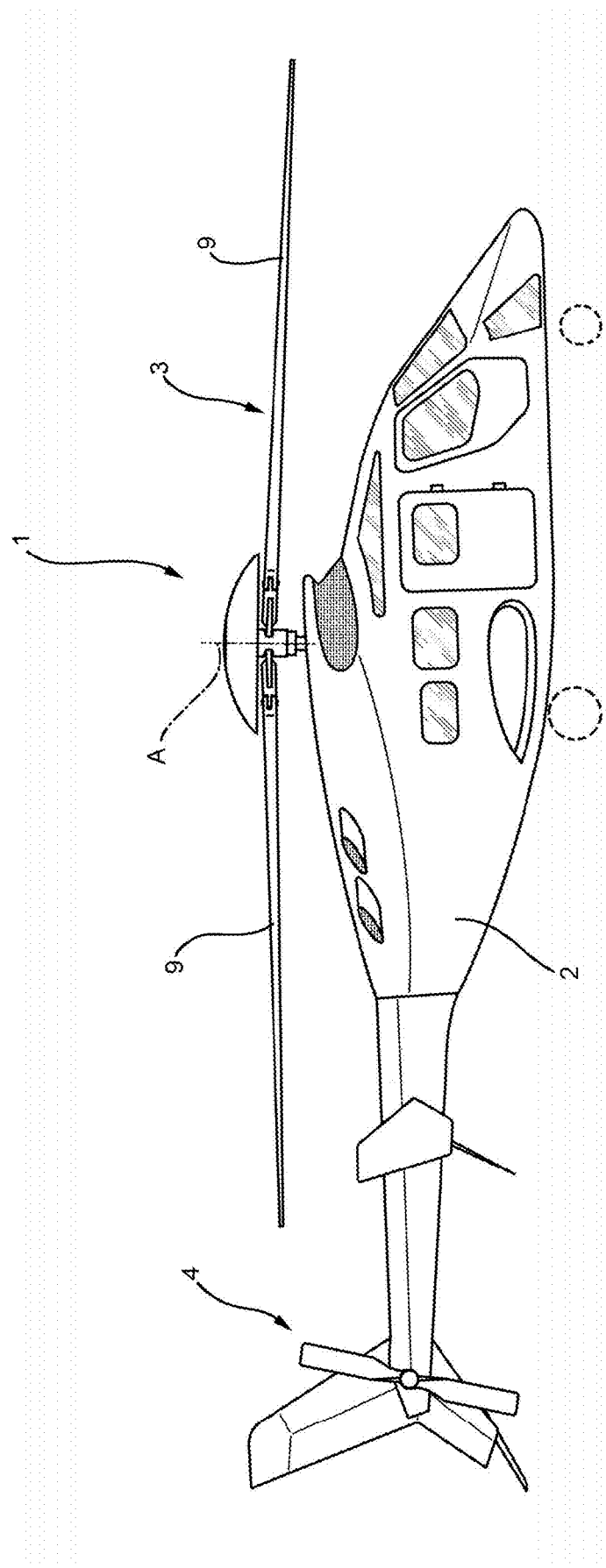
FIG. 1 shows a side view of a helicopter comprising a rotor in accordance with the present invention.

Number 1 in FIG. 1 indicates a hover aircraft, in particular a helicopter substantially comprising a fuselage 2; a main rotor 3 on top of fuselage 2 and which rotates about an axis A; and a tail rotor 4 at the rear end of fuselage 2, and which rotates about a respective axis crosswise to axis A.

More specifically, rotor 3 comprises a hollow hub 5, of axis A, fitted with and from which project a number of blades 9 extending radially with respect to axis A.

Rotor 3 also comprises a drive shaft 6 which rotates about axis A, is angularly integral with hub 5, and is connected, in a manner not shown, to a drive member, e.g. a turbine, on helicopter 1. More specifically, shaft 6 is hollow.

More specifically (FIG. 2), shaft 6 is housed partly inside hub 5, and is connected angularly integral with hub 5 by a spline and by two wedges interposed radially between shaft 6 and hub 5. More specifically, the spline is interposed axially between the two wedges.

Rotor 3 also comprises a flow diverter 10 for guiding the wash, produced by rotation of rotor 3, along a given path designed to prevent vibration produced by the wash from the ends of blades 9 on opposite sides of hub 5.

More specifically, diverter 10 is annular, extends about axis A, and is located on the opposite side of hub 5 to fuselage 2.

Diverter 10 is in the form of a 'cap', and is bounded by two axially facing walls 11 and 12. More specifically, wall 11 defines diverter 10 axially on the opposite side to hub 5, and wall 12 defines diverter 10 axially on the hub 5 side.

Wall 11 is continuous and extends, radially outwards of axis A, at decreasing axial distances from hub 5.

Wall 12 has a circular first peripheral edge 13; and a second peripheral edge (not shown in FIG. 2) opposite and radially outwards of peripheral edge 13. The second peripheral edge of wall 12 also axially faces a peripheral edge of wall 11.

Walls 11 and 12 are designed so that the axial distance between them decreases radially outwards of axis A.

More specifically, working from edge 13 towards the second edge, wall 12 extends first away from and then towards hub 5.

Walls 11 and 12 are connected to each other by a truncated-cone-shaped tubular body symmetrical with respect to axis A, and a lateral surface of which extends between walls 11 and 12.

Rotor 3 also comprises a vibration damping device 15.

Device 15 substantially comprises a mass 17 connected functionally to hub 5 and to shaft 6 to oppose transmission of the vibration produced by rotation of blades 9.

Mass 17 is advantageously free to oscillate parallel to axis A, to prevent vibration parallel to axis A from being transmitted to shaft 6 and therefore to hub 5 and fuselage 2.

In other words, device 15 reduces transmission of axial vibration to shaft 6.

Device 15 also comprises an actuator 30 connected functionally to mass 17 and controllable to generate on mass 17 a first damping force with a main component parallel to axis A, so as to prevent vibration parallel to axis A from being transmitted to shaft 6 and hub 5.

More specifically, device 15 comprises a guide 16 coaxial with axis A and along which mass 17 is mounted to oscillate parallel to axis A.

Actuator 30 comprises a body 31 housed in shaft 6 and defining a cavity for housing mass 17.

Guide 16 extends through body 31.

Mass 17 is a tubular body, of axis A, through which guide 16 extends coaxially.

More specifically, mass 17 is connected elastically, at opposite axial end surfaces 18 and 19, to body 31 by elastic means.

In the example shown, the elastic means comprise a first and second coil spring 32 with respective axes parallel to axis A.

First spring 32 is interposed between surface 18 and a body 45 of device 15, and second spring 32 is interposed between surface 19 and a body 56 of actuator 30, connected to body 31.

In other words, mass 17 is suspended elastically inside body 31 to oscillate along guide 16.

The rigidity, parallel to axis A, of each coil spring and the size of mass 17 are preferably such that the natural frequency of the system formed by them equals $N*\Omega$, where N is the number of blades 9, and $\Omega$ is the rotation frequency of shaft 6.

Device 15 also comprises:
- a sensor 33 (shown schematically in FIG. 2) for generating a number of signals associated with the acceleration status of shaft 6 parallel to axis A and in a plane perpendicular to axis A; and
- a control unit 34 (FIG. 4) designed to generate a damping force on mass 17 on the basis of one of the signals generated by sensor 33.

More specifically, sensor 33 is an accelerometer that detects acceleration values at a centre O of hub 5, in a direction parallel to axis A, and in two directions in the plane perpendicular to axis A.

In the example shown, sensor 33 is mounted along axis A. Preferably, sensor 33 is located at centre O of hub 5.

Control unit 34 controls actuator 30 on the basis of the acceleration value, parallel to axis A, detected by sensor 33.

Actuator is controlled by control unit 34 to generate on mass 17 a sinusoidal first damping force having a main component along axis A, and a frequency of around $N*\Omega$, where N is the number of blades 9, and $\Omega$ is the rotation frequency of shaft 6.

This sinusoidal force causes mass 17 to oscillate parallel to axis A and to oscillate along guide 16.

Figure 2:
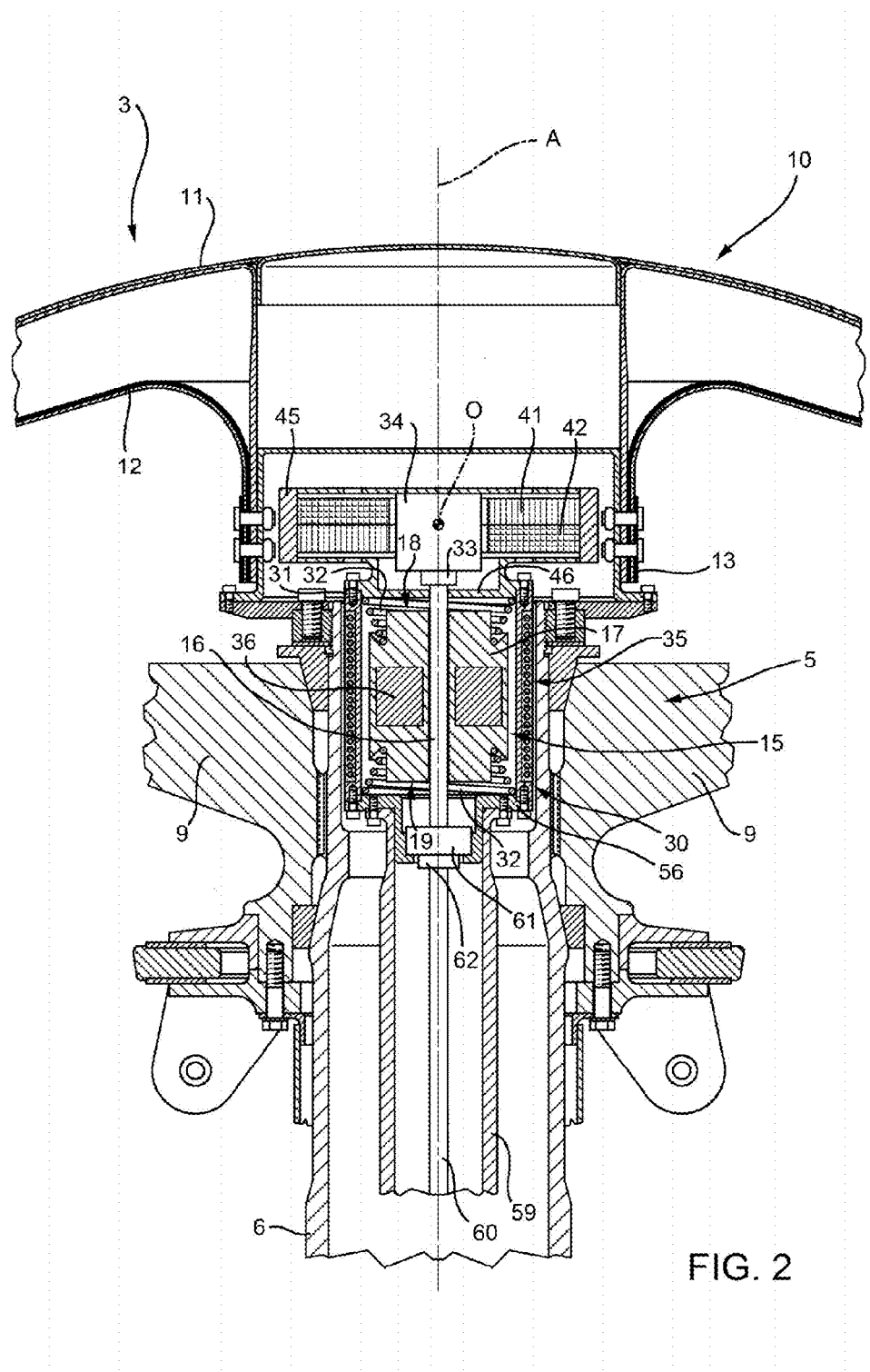
FIG. 2 shows a section of the FIG. 1 rotor, with parts only shown partly for the sake of clarity.
Figure 3:
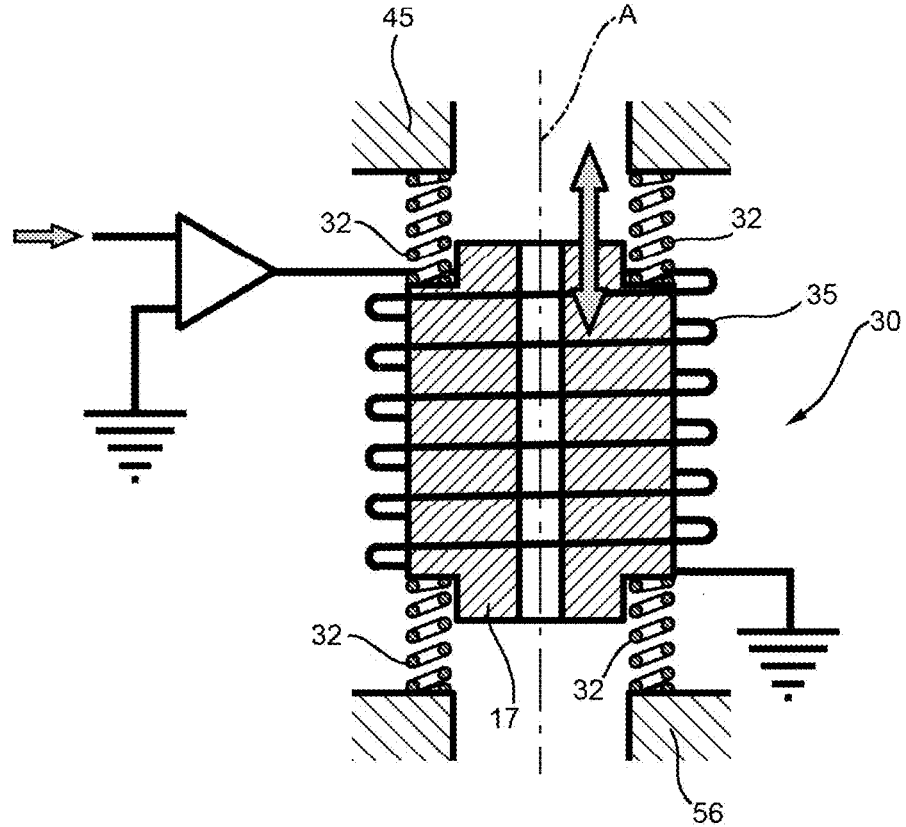
FIG. 3 shows a number of component parts of the FIGS. 1 and 2 rotor.

In the FIG. 2 embodiment, actuator 30 comprises:
- a number of windings 35 fitted to body 31 and connected functionally to control unit 34; and
- a permanent magnet 36 fitted to mass 17 and coupled magnetically to windings 35.

More specifically, control unit 34 causes alternating current to circulate in windings 35. By virtue of the magnetic coupling between windings 35 and permanent magnet 36, the alternating current produces the first damping force, directed parallel to axis A, on mass 17.

Device 15 also comprises two actuators 41, 42 connected functionally to shaft 6 and controllable to generate on shaft 6, respectively, a second and third damping force with components in the plane perpendicular to axis A.

Actuators 41 and 42 thus reduce transmission to shaft 6, and therefore to hub 5 and fuselage 2, of forces in the plane perpendicular to axis A.

More specifically, actuators 41, 42 are in the form of superimposed rings rotated by shaft 6 and mounted to rotate with respect to shaft 6 about axis A.

Actuator 41 rotates with respect to shaft 6 about axis A in the same direction as rotation of shaft 6 about axis A, and at a frequency of $(N-1)*\Omega$.

The second damping force generated on shaft 6 by actuator 41 is sinusoidal, with a frequency of $(N-1)*\Omega$.

Actuator 42 rotates about axis A in the opposite direction to rotation of shaft 6, and with a frequency of $(N+1)*\Omega$.

The third damping force generated on drive shaft 6 by actuator 42 is sinusoidal with a frequency of $(N+1)*\Omega$.

The second and third damping force therefore both have, with respect to fuselage 2, a frequency of $N*\Omega$, where N is the number of blades 9, and 0 is the rotation frequency of shaft 6. Frequency $N*\Omega$ corresponds to the frequency of the vibration for damping, i.e. the vibration transmitted from blades 9 to fuselage 2.

Actuators 41, 42 are housed inside and rotate with respect to body 45, which rotates about axis A and is fixed to body 31, and therefore to shaft 6 and hub 5.

More specifically, body 45 is hollow, and is located, with respect to body 31, on the same side as diverter 10 and on the opposite side to body 56.

Control unit 34 is also housed in body 45, and is surrounded by actuators 41, 42.

Body 45 preferably comprises a base 46 located on the mass 17 side and fixed to guide 16. Body 45 is also fixed to control unit 34.

More specifically, actuators 41, 42 are centrifugal force generating types, i.e. each comprise a disk eccentric with respect to a corresponding axis B, C.

The amplitude of the second and third damping force generated by actuators 41, 42 is obtained by adjusting the angular distance between the two eccentric disks of actuators 41, 42.

The phase of the second and third damping force generated by actuators 41, 42 is controlled by adjusting the mean azimuth value of the respective eccentric disks.

Depending on the rotation speed of actuators 41, 42 with respect to axis A, the position of the corresponding masses varies, so as to respectively create a sinusoidal second and third damping force varying in modulus and phase.

Actuators 41, 42 are controlled by control unit 34 on the basis of the quantity measured by sensor 33.

As shown schematically in FIG. 4, control unit 34 comprises a number, of stages 37a, 37b, 37c, each of which receives a respective input signal 26a, 26b, 26c from sensor 33, and supplies a respective output signal 27a, 27b, 27c for a respective actuator 30, 41, 42.

More specifically, stages 37a, 37b, 37c are independent of one another, i.e. each stage 37a, 37b, 37c only receives respective input signal 26a, 26b, 26c, and only generates respective output signal 27a, 27b, 27c.

Finally, device 15 comprises:
- a cable 60 connected electrically to an electric power source (not shown) fixed with respect to axis A;
- a conduit 59 housing cable 60;
- a slip-ring 61 connected electrically to cable 60 and for maintaining electric connection between cable 60, fixed with respect to axis A, and control unit 34; and
- an encoder 62 for determining the angular position of shaft 6 about axis A.

Cable 60, conduit 59, slip-ring 61, and encoder 62 are located on the axially opposite side of axis A to diverter 10.

Cable 60, encoder 62, slip-ring 61, and conduit 59 extend coaxially with axis A.

Conduit 59 is fixed to body 56, on the opposite side to body 31.

In actual use, shaft 6 rotates hub 5 and blades 9 about axis A.

More specifically, shaft 6 may rotate about axis A at variable angular speed and, therefore, variable frequency $\Omega$.

Rotation of hub 5 and blades 9 produces vibration, which is transmitted to shaft 6 and from this to fuselage 2 of helicopter 1.

This vibration is predominantly of frequency $N*\Omega$, where N is the number of blades 9, and $\Omega$ is the rotation frequency of shaft 6.

Acceleration of shaft 6 is detected by sensor 33.

On the basis of the acceleration values parallel to axis A, control unit 34 commands actuator 30 to generate the first damping force on mass 17. The first damping force is sinusoidal, is directed parallel to axis A, and has a frequency of $N*\Omega$.

The first damping force causes mass 17 to oscillate along axis A on guide 16, and so damps vibration transmitted to shaft 6 and to fuselage 2 with a component parallel to axis A.

More specifically, control unit 34 causes alternating current to flow inside electric windings 35. And, because of the magnetic coupling between electric windings 35 and permanent magnet 36, the first axial damping force is generated on mass 17.

On the basis of the acceleration values detected by sensor 33 in the plane perpendicular to axis A, control unit 34 also commands actuators 41 and 42 to generate the second and third damping force, respectively, on mass 17.

More specifically, actuator 41 rotates in the same direction as shaft 6, at frequency $(N-1)*\Omega$.

The second damping force generated by actuator 41 is sinusoidal, lies in a plane parallel to the axis of shaft 6, and is directed radially with respect to axis A.

The second damping force has a frequency of $(N-1)*\Omega$.

Actuator 42 rotates in the opposite direction to shaft 6, at a frequency of $(N+1)*\Omega$.

The third damping force generated by actuator 42 is sinusoidal, lies in a plane parallel to the axis of shaft 6, and is directed radially with respect to axis A.

The third damping force has a frequency of $(N+1)*\Omega$.

Since actuator 41 rotates about axis A at frequency $(N-1)*\Omega$ in the same direction as shaft 6, and actuator rotates about axis A at frequency $(N+1)*\Omega$ in the opposite direction to shaft 6, both have, with respect to fuselage 2, rotation frequencies $N*\Omega$, and rotate respectively in the same and opposite direction to shaft 6.

The rotation frequency of actuators 41, 42 with reference to fuselage 2 therefore corresponds to the frequency $N*\Omega$ of the vibration for damping, and induced on fuselage 2 by blades 9.

Actuators 41, 42 are thus effective in reducing transmission to fuselage 2 of vibration in the plane parallel to axis A.

The advantages of rotor 3 according to the present invention will be clear from the above description.

In particular, device 15 allows mass 17 to oscillate freely along axis A, thus enabling mass 17, unlike the solutions described in the introduction, to effectively prevent vibration directed parallel to axis A from being transmitted from blades 9 to fuselage 2.

Actuator 30 of device 15 also exerts on mass 17 the first damping force directed parallel to axis A and at frequency $N*\Omega$.

This way, device 15 is able to reduce transmission of vibration from blades 9 to fuselage 2 over a wide range of vibration frequencies.

This makes device 15 especially suitable for use on a variable-speed rotor 3.

In fact, as the rotation speed of the rotor varies, the frequency $N*0$ of the vibration transmitted from blades 9 to fuselage 2 varies accordingly. And device 15 is able to adapt to this variation in the rotation speed of rotor 3 by simply controlling actuator 30 to vary the frequency of the first damping force.

The natural frequency of the vibration along axis A of the system defined by mass 17 and elastic means 32 corresponds to the frequency $N*\Omega$ of the vibration for damping.

The energy required to generate the first damping force may thus be reduced.

Moreover, in the event of a malfunction or failure of actuator 30, mass 17 continues oscillating freely at a frequency equal to the frequency $N*\Omega$ of the vibration for damping, thus at least partly continuing to reduce the vibration transmitted to fuselage 2.

Actuators 41, 42 reduce vibration transmitted to fuselage 2 in the plane perpendicular to axis A, and are actively tunable to different rotation frequencies of rotor 3.

Control unit 34 controls actuators 30, 41, 42 on the basis of input signals generated by one sensor 33, and generates output control signals for actuators 30, 41, 42.

Each stage 37a, 37b, 37c of control unit 34 receives a respective input signal 26a, 26b, 26c, and supplies a respective output signal 27a, 27b, 27c which depends solely on the respective input signal 26a, 26b, 26c.

The logic of control unit 34 is therefore extremely simple, thus reducing the overall cost of device 15.

Device 15 can be installed easily to upgrade existing rotors 3 comprising hub 5, shaft 6 and blades 9.

This can be done by simply fixing device 15 inside rotor 3, and connecting cable 60 to the electric power source.

Clearly, changes may be made to rotor 3 as described and illustrated herein without, however, departing from the protective scope defined in the accompanying Claims.

More specifically, actuator 30 may be replaced by two actuators similar to actuators 41, 42, mounted between actuators 41 and 42, and rotating in respective opposite directions.

Sensor 33 may generate a signal associated solely with acceleration parallel to axis A of shaft 6.

As opposed to an accelerometer, sensor 33 may be a deformation or load sensor, or a hybrid sensor for detecting both load and acceleration of shaft 6.

The invention claimed is:

1. A hover aircraft rotor (3) comprising:
   a hub (5) which rotates about an axis (A) and comprises a number of blades (9);
   a drive shaft (6) connectable to a drive member of said aircraft (1) and connected functionally to said hub (5) to rotate the hub (5) about said axis (A); and
   damping means (15) for damping vibration transmitted to said shaft (6), and which comprise a mass (17) designed to oscillate, in use, to oppose transmission to said shaft (6) of vibration generated by rotation of said blades (9);
   the rotor being characterized in that said mass (17) is free to oscillate parallel to said axis (A), to oppose transmission to said shaft (6) of vibration having main components along said axis (A);
   said damping means (15) comprising at least one first actuator (30) connected functionally to said mass (17) and controllable to generate on said mass (17) a first damping force having a main component parallel to said axis (A);
   said first actuator (30) being controllable to generate said first damping force on said mass (17) with a main component parallel to said axis (A) and at a frequency varying, in use, according to the angular speed of said rotor (3) about said axis (A), so as to cause said mass (17) to oscillate parallel to said axis (A);
   the rotor further comprising at least one elastic member (32) interposed between said mass (17) and said first actuator (30);
   said elastic member (32) having an axis parallel to said axis (A).

2. A rotor as claimed in claim 1, characterized in that said first actuator (30) is controllable to generate said first damping force at a first frequency f=N*Ω, where N is the number of said blades, and Ω is the rotation frequency of the rotor (3).

3. A rotor as claimed in claim 2, characterized by comprising said elastic member (32) and said mass (17) having a natural oscillation frequency, parallel to said axis (A), of N*Ω.

4. A rotor as claimed in claim 1, characterized in that said first actuator (30) comprises a guide (16) coaxial with said axis (A), and on which said mass (17) is mounted to oscillate with respect to said axis (A).

5. A rotor as claimed in claim 1, characterized in that said first actuator (30) comprises a body (31) connected to said shaft (6) and which rotates integrally with said shaft about said axis (A);
   one (17) of said body (31) and said mass (17) comprising at least one permanent magnet (36) coupled magnetically to an electric winding (35) carried by the other (31) of said body (31) and said mass (17).

6. A rotor as claimed in claim 5, characterized in that said first actuator (30) also comprises:
   a slip-ring (61) for electrically powering said electric winding (35); and
   an encoder (62) for determining the angular position of said shaft (6) about said axis (A).

7. A rotor as claimed in claim 1, characterized in that said shaft (6) is hollow, and at least partly houses said first actuator (30).

8. A rotor as claimed in claim 1, characterized in that said damping means (15) comprise a second actuator (41) and a third actuator (42), which are connected functionally to said mass (17) and controllable to generate a second damping force and a third damping force on said mass (17) respectively; said second damping force and said third damping force each having a main component in a plane perpendicular to said axis (A), so as to prevent transmission to said shaft (6) of vibration in said plane perpendicular to said axis (A).

9. A rotor as claimed in claim 8, characterized in that said second actuator (41) and said third actuator (42) are rotated about said axis (A) by said shaft (6), and rotate, in use, with respect to said shaft (6) and about said axis (A);
   said second actuator (41) being controllable to generate said second damping force at a second frequency of (N−1)*Ω, and by rotating at said second frequency in the same direction as and with respect to said shaft (6);
   said third actuator (42) being controllable to generate said third damping force at a third frequency of (N+1)*Ω, and by rotating at said third frequency in the opposite direction to and with respect to said shaft (6); wherein N is the number of said blades, and Ω is the rotation frequency of the rotor (3).

10. A rotor as claimed in claim 8, characterized by comprising:
    a sensor (33) for generating at least one number of signals associated with the acceleration status of said shaft (6) along said axis (A) and in a plane perpendicular to said axis (A); and
    a control unit (34) controllable to command said first, second and third actuator (30, 41, 42), on the basis of said quantity detected by said sensor (33), to generate said first, second and third damping force respectively.

11. A rotor as claimed in claim 10, characterized in that said sensor (33) is located along said axis (A).

12. A rotor as claimed in claim 10, characterized in that said control unit (34) comprises three stages (37a, 37b, 37c) supplied with respective inputs (26a, 26b, 26c) from said sensor (33) and designed to generate respective outputs (27a, 27b, 27c) for said first, second, and third actuator (30, 41, 42);
    each said stage (37a, 37b, 37c) being designed to generate the respective output (27a, 27b, 27c) solely on the basis of a respective input (26a, 26b, 26c).

13. A hover aircraft (1), characterized by comprising a rotor (3) as claimed in claim 1.

14. A rotor as claimed in claim 1, characterized in that said first actuator (30) comprises a guide (16) coaxial with said axis (A), and on which said mass (17) is mounted to oscillate with respect to said axis (A);

said actuator (30) comprising a body (31) housed in said shaft (6) and defining a cavity for housing said mass (17);

said mass (17) being a tubular body parallel to said axis (A) and through which said guide (16) extends coaxially.

\* \* \* \* \*